United States Patent
Maeda et al.

(10) Patent No.: US 11,951,436 B2
(45) Date of Patent: Apr. 9, 2024

(54) ADSORPTION SYSTEM

(71) Applicant: DAIKIN INDUSTRIES, LTD., Osaka (JP)

(72) Inventors: Takashi Maeda, Osaka (JP); Shuji Ikegami, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/233,195

(22) Filed: Aug. 11, 2023

(65) Prior Publication Data

US 2023/0381709 A1    Nov. 30, 2023

Related U.S. Application Data

(63) Continuation of application No. PCT/JP2022/004722, filed on Feb. 7, 2022.

(30) Foreign Application Priority Data

Mar. 15, 2021    (JP) ................. 2021-041305

(51) Int. Cl.
  B01D 53/04    (2006.01)
  B01J 20/22    (2006.01)

(52) U.S. Cl.
  CPC ..... B01D 53/0438 (2013.01); B01D 53/0454 (2013.01); *B01D 2221/16* (2013.01); *B01D 2253/204* (2013.01)

(58) Field of Classification Search
  CPC ........... B01D 53/04; B01D 53/0438; B01D 53/0454; B01D 2221/16; B01D 2253/504
  USPC ............. 95/114, 115; 96/121, 131, 132, 134
  See application file for complete search history.

(56) References Cited

U.S. PATENT DOCUMENTS

| | | | | |
|---|---|---|---|---|
| 4,264,340 A | * | 4/1981 | Sircar | B01D 53/0476 |
| | | | | 95/122 |
| 4,934,148 A | * | 6/1990 | Prasad | B01D 53/268 |
| | | | | 95/52 |
| 2009/0092818 A1 | | 4/2009 | Kiener et al. | |
| 2009/0305040 A1 | | 12/2009 | Schubert et al. | |
| 2012/0167761 A1 | | 7/2012 | Kiener et al. | |

(Continued)

FOREIGN PATENT DOCUMENTS

EP    2 740 525 A1    6/2014
JP    5150617 B2    12/2012

(Continued)

OTHER PUBLICATIONS

International Search Report of corresponding PCT Application No. PCT/JP2022/004722 dated Mar. 22, 2022.

(Continued)

*Primary Examiner* — Frank M Lawrence, Jr.

(74) *Attorney, Agent, or Firm* — Global IP Counselors, LLP

(57) ABSTRACT

An adsorption system is placed in an air passage used to supply air to a room. The adsorption system includes an adsorption section that adsorbs a target substance except water, and a reduction section that reduces accumulation of moisture in the adsorption section. An adsorbent used in the adsorption section contains a metal-organic framework. The reduction section includes a heating element that heats the adsorption section and evaporates moisture in air that has flowed into the adsorption section.

11 Claims, 2 Drawing Sheets

(56) References Cited

U.S. PATENT DOCUMENTS

| | | |
|---|---|---|
| 2013/0210620 A1 | 8/2013 | Kiener et al. |
| 2014/0131903 A1 | 5/2014 | Youn |
| 2019/0193019 A1 | 6/2019 | Okano |

FOREIGN PATENT DOCUMENTS

| | | |
|---|---|---|
| JP | 2014-113539 A | 6/2014 |
| JP | 2014-519003 A | 8/2014 |
| JP | 2019-113254 A | 7/2019 |

OTHER PUBLICATIONS

International Preliminary Report of corresponding PCT Application No. PCT/JP2022/004722 dated Sep. 28, 2023.

* cited by examiner

ADSORPTION SYSTEM

CROSS-REFERENCE TO RELATED APPLICATIONS

This is a continuation of International Application No. PCT/JP2022/004722 filed on Feb. 7, 2022, which claims priority to Japanese Patent Application No. 2021-041305, filed on Mar. 15, 2021. The entire disclosures of these applications are incorporated by reference herein.

BACKGROUND

Technical Field

The present disclosure relates to an adsorption system.

Background Art

A porous material having pores therein is typically used to adsorb a target substance in the air. As such a porous material, a metal-organic framework (MOF) has drawn attention in recent years. The metal-organic framework is a combination of a metal ion and an organic ligand linking the metal ion. MOFs that adsorb various target substances are obtainable by different combinations of the metal ion and the organic ligand.

For example, Japanese Patent No. 5150617 discloses obtaining an MOF that adsorbs carbon dioxide using an aluminum ion as the metal ion and a fumarate ion as the organic ligand.

SUMMARY

A first aspect of the present disclosure is directed to an adsorption system placed in an air passage used to supply air to a room. The adsorption system includes an adsorption section configured to adsorb a target substance except water, and a reduction section configured to reduce accumulation of moisture in the adsorption section. An adsorbent used in the adsorption section containing a metal-organic framework. The reduction section includes a heating element configured to heat the adsorption section and evaporate moisture in air that has flowed into the adsorption section.

DETAILED DESCRIPTION OF EMBODIMENT(S)

Figure 1:
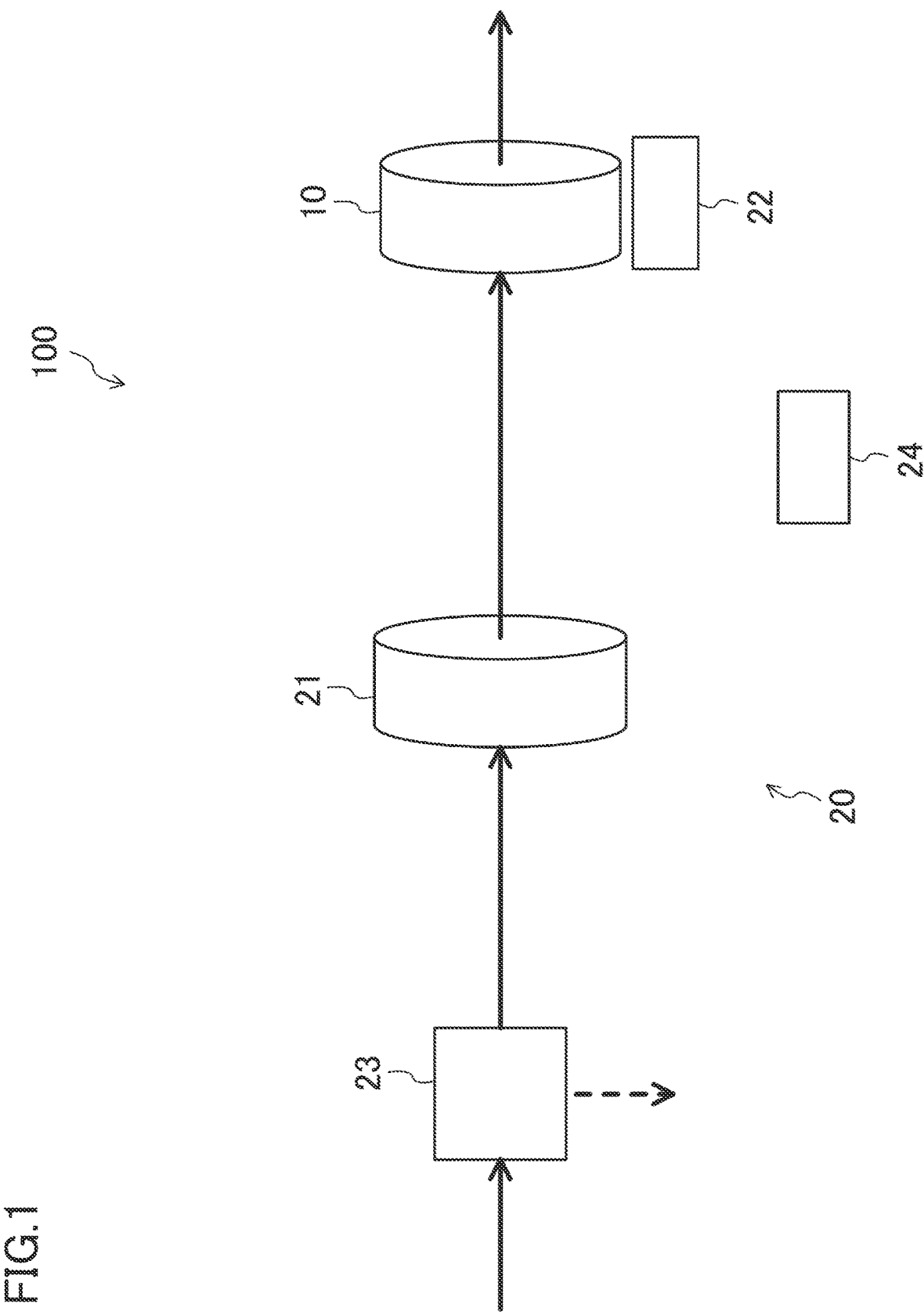
FIG. 1 is a schematic view showing an example configuration of an adsorption system according to an embodiment.

An embodiment will be described with reference to the drawings. An adsorption system (100) according to this embodiment shown in FIG. 1 includes an adsorption section (10) using an adsorbent that contains a metal-organic framework (hereinafter referred to as an "MOF"). The adsorption system (100) may be integral with an outdoor unit of an air conditioner, for example. The adsorption system (100) may be placed, for example, in an air passage for taking outdoor air and supplying the air to a room. A fan may be placed in the air passage, upstream or downstream of the adsorption section (10). In FIG. 1, the arrows represent the flow of the air in the adsorption system (100).

The adsorption section (10) adsorbs a target substance (except water) in the air, such as carbon dioxide and a volatile organic compound (VOC). The adsorption section (10) adsorbs the target substance in the air flowing in from the upstream side and allows the air from which the target substance is removed or reduced to flow out to the downstream side. The adsorption section (10) may be in a disk shape, for example. The adsorption section (10) may be configured, for example, as a substrate having a honeycomb structure and a surface where an adsorbent is held. The adsorption section (10) may be configured to allow the air to pass therethrough in the thickness direction and cause the passing air to come into contact with the adsorbent. In the present disclosure, the "adsorbent" includes a material (what is called a sorbent) that adsorbs and absorbs a target substance.

The substrate of the adsorption section (10) may be made from a material such as ceramic paper, glass fibers, organic compounds (for example, paper) whose main component is cellulose, metals, and resins. These materials have lower specific heat. If the adsorption section (10) is made of these materials, an "adsorption and desorption section" has a lower heat capacity.

The MOF to be contained in the adsorbent of the adsorption section (10) can be selected as appropriate from various combinations of a metal ion and an organic ligand in accordance with the purpose of the adsorption system, such as the target substance to be adsorbed. The adsorbent of the adsorption section (10) may contain a plurality of types of MOFs or an MOF in combination with another adsorbent substance.

In the adsorption section (10), the adsorbent may be regenerated as appropriate by utilizing a temperature change or a pressure change, for example, to avoid saturation of adsorption of the target substance by the adsorbent. The adsorbent may be regenerated as regular maintenance targeting the whole adsorption section (10), for example. Alternatively, the adsorption section (10) may be configured as a rotor, so that the adsorbent in a respective part of the adsorption section (10) is regenerated when the part comes to a predetermined regeneration region as the adsorption section (10) rotates.

As shown in FIG. 1, the adsorption system (100) further includes a reduction section (20) configured to reduce the accumulation of moisture in the adsorption section (10). In this embodiment, the reduction section (20) includes a dehydration element (21), a heating element (22), a decrease element (23), and a control unit (24).

The dehydration element (21) is placed upstream of the adsorption section (10). The dehydration element (21) removes or reduces the moisture in the air flowing into the adsorption section (10). The dehydration element (21) may be a dehumidifier, for example. The dehydration element (21) may dehumidify the air by having the moisture in the air adsorbed on the adsorbent. The adsorbent may be silica or zeolite, for example. In the dehydration element (21), the adsorbent that has adsorbed moisture may be regenerated by heating, for example, to be used again for dehumidification. The dehydration element (21) may be configured as a rotor, so that the adsorbent in a respective part of the dehydration element (21) is regenerated when the part comes to a predetermined regeneration region as the dehydration element (21) rotates.

The heating element (22) heats the adsorption section (10) to evaporate the moisture in the air that has flowed into the adsorption section (10). The evaporated moisture flows out to the downstream side of the adsorption section (10) along with the flow of the air. The heating element (22) may always heat the adsorption section (10) or may heat the adsorption section (10) regularly or upon satisfaction of predetermined conditions. The heating element (22) may be a heater, for example. The heating element (22) may be placed near the adsorption section (10) or integral with the adsorption section (10). In a case in which the adsorbent used in the adsorption section (10) is regenerated by changing a temperature (e.g., heating), the heating element (22) for evaporating the moisture may be used as the heating element for regenerating the adsorbent. In this case, the heating element (22) performs the temperature control for regenerating the adsorbent and the temperature control for evaporating the moisture in parallel.

The decrease element (23) can decrease the flow rate of the air flowing into the adsorption section (10). The decrease element (23) may block the flow of the air into the adsorption section (10). The decrease element (23) may be a three-way valve, for example. The decrease element (23) is placed upstream of the adsorption section (10), for example, upstream of the dehydration element (21). The decrease element (23) may always decrease the air flow rate or may decrease the air flow rate regularly or upon satisfaction of predetermined conditions.

The control unit (24) controls the operation of at least one selected from the group consisting of the dehydration element (21), the heating element (22), and the decrease element (23) in accordance with the humidity of the air flowing into the adsorption section (10), thereby controlling the operation for reducing the accumulation of the moisture in the adsorption section (10). For example, if the humidity of the air flowing into the adsorption section (10) exceeds a predetermined value, the control unit (24) causes the heating element (22) to heat the adsorption section (10) or causes the decrease element (23) to decrease the flow rate of the air flowing into the adsorption section (10). The humidity of the air flowing into the adsorption section (10) is detected, for example, by a sensor (not shown) arranged near the upstream side of the adsorption section (10). The control unit (24) can obtain the detected value. The control unit (24) may be comprised, for example, of a microcomputer (not shown) and a program for operating the microcomputer.

Features of Embodiment

As described above, the adsorption system (100) of this embodiment includes: an adsorption section (10) configured to adsorb a target substance except water; and a reduction section (20) configured to reduce accumulation of moisture in the adsorption section (10), wherein an adsorbent used in the adsorption section (10) contains a metal-organic framework (MOF). Thus, the accumulation of the moisture in the adsorption section (10) is reduced, thereby making it possible to reduce the degradation of the adsorption performance of the MOF due to the moisture. It is also possible to increase the efficiency in adsorbing the target substance by the MOF by removing the moisture trapped, instead of the target substance, by the MOF.

Figure 2:
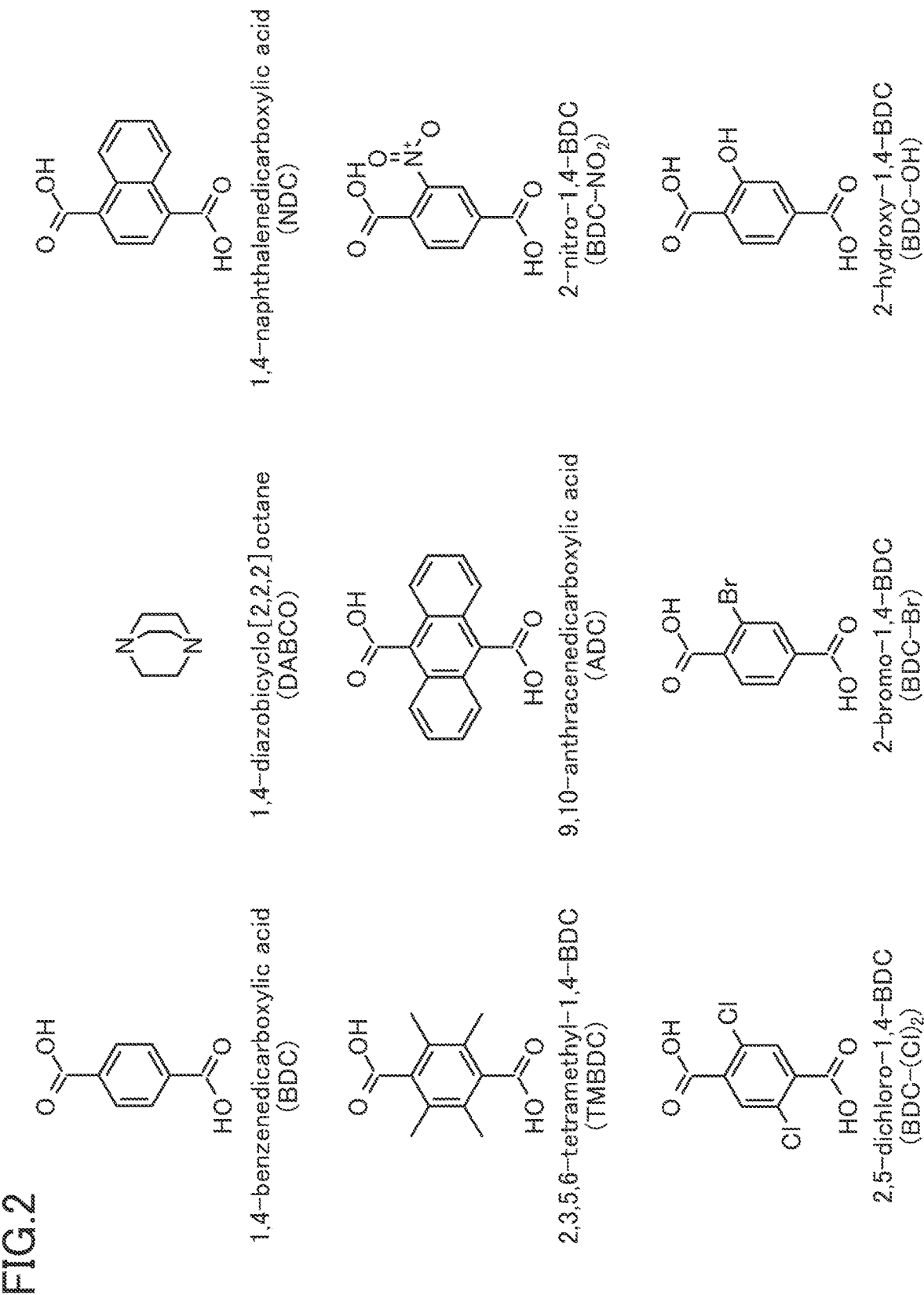
FIG. 2 shows examples of an organic ligand of a metal-organic framework applicable to an adsorbent of the adsorption system according to the embodiment.

According to the adsorption system (100) of this embodiment, it is possible to reduce the degradation of the adsorption performance of the MOF due to the moisture even if a zinc-containing MOF, less resistant to water, is used as the adsorbent. FIG. 2 shows examples of the organic ligand forming the zinc-containing MOF. Combining the organic ligand shown in FIG. 2 and zinc (Zn) can provide MOFs, such as $Zn(NDC)(DABCO)_{0.5}$ (abbr. DMOF-N), $Zn(BDC)_{0.5}(TMBDC)_{0.5}(DABCO)_{0.5}$ (abbr. DMOF-TM1), $Zn(TMBDC)(DABCO)_{0.5}$ (abbr. DMOF-TM2), $Zn(ADC)(DABCO)_{0.5}$ (abbr. DMOF-A), $Zn(BDC-NO_2)(DABCO)_{0.5}$ (abbr. DMOF-N), $Zn(BDC-(Cl)_2)(DABCO)_{0.5}$ (abbr. DMOF-$Cl_2$), $Zn(BDC-Br)(DABCO)_{0.5}$ (abbr. DMOF-Br), and $Zn(BDC-OH)(DABCO)_{0.5}$ (abbr. DMOF-OH). These zinc-containing MOFs exhibit excellent adsorption performance for carbon dioxide under atmospheric pressure. These zinc-containing MOFs can desorb carbon dioxide as the pressure is lowered, and hence can be used as an adsorbent that can be regenerated by a pressure change. However, if exposed to water, most of these zinc-containing MOFs will lose the porous structure and exhibit lower adsorption performance for carbon dioxide. On the other hand, according to the adsorption system (100) of this embodiment, the accumulation of the moisture in the adsorption section (10) is reduced, thereby making it possible to reduce the degradation of adsorption performance for carbon dioxide even when these zinc-containing MOFs are used as the adsorbent.

In the adsorption system (100) of this embodiment, the reduction section (20) may include a dehydration element (21) placed upstream of the adsorption section (10). The dehydration element (21) in this configuration can reduce the moisture in the air flowing into the adsorption section (10). Accordingly, the accumulation of the moisture in the adsorption section (10) is reduced.

In the adsorption system (100) of this embodiment, the reduction section (20) may include a heating element (22) configured to heat the adsorption section (10). The heating element (22) in this configuration can evaporate the moisture in the air that has flowed into the adsorption section (10) and release the evaporated moisture to the downstream side of the adsorption section (10). Accordingly, the accumulation of the moisture in the adsorption section (10) is reduced.

In the adsorption system (100) according to this embodiment, the reduction section (20) may include a decrease element (23) configured to decrease a flow rate of air flowing into the adsorption section (10). In this configuration, it is also possible to reduce the amount of the moisture in air flowing into the adsorption section (10) by decreasing the flow rate of the air flowing into the adsorption section (10). Accordingly, the accumulation of the moisture in the adsorption section (10) is reduced.

In the adsorption system (100) of this embodiment, the reduction section (20) may perform a reduction operation of reducing the accumulation of the moisture in accordance with a humidity of air flowing into the adsorption section (10). In this configuration, the reduction section (20) can reduce the accumulation of the moisture efficiently in accordance with the humidity of the air, thereby making it possible to reduce the energy consumption of the heating element (22), for example.

Other Embodiments

An example has been described above in the embodiment where carbon dioxide is the target substance to be adsorbed and desorbed. The target substance is however not limited thereto and may be an odor substance (e.g., sulfur or ammonia), for example.

An example has been described above in the embodiment where the zinc-containing MOF is used as the adsorbent. The adsorbent is however not limited thereto and may be another type of MOF, such as an aluminum-containing MOF.

In the embodiment described above, the dehydration element (21), the heating element (22), the decrease element (23), and the control unit (24) form the reduction section (20). Instead, for example, any one of the dehydration element (21), the heating element (22), and the decrease element (23), or any one of them in combination with the control unit (24), may form the reduction section (20). Alternatively, for example, any two of the dehydration element (21), the heating element (22), and the decrease element (23), or any two of them in combination with the control unit (24), may form the reduction section (20).

The decrease element (23) is placed upstream of the dehydration element (21) in the embodiment described above. Instead, the decrease element (23) may be placed downstream of the dehydration element (21). In another example, a first air passage with the dehydration element (21) and a second air passage without the dehydration element (21) may be provided upstream of the adsorption section (10): If the humidity of the air flowing into the adsorption section (10) is higher than or equal to a predetermined value, the air flows into the adsorption section (10) via the first air passage; and if the humidity is lower than the predetermined value, the air flows into the adsorption section (10) via the second air passage.

The substrate of the adsorption section (10) has a honeycomb structure in the embodiment described above. However, the substrate is not limited thereto and may be in a mesh shape or a filter shape. Even in these shapes, the adsorption section (10) is configured to allow air to pass therethrough. The adsorption section (10) is in the disk shape, but not limited thereto, and may be in a polygonal plate shape, for example.

While the embodiment has been described above, it will be understood that various changes in form and details can be made without departing from the spirit and scope of the claims. The above embodiment may be combined or replaced as appropriate as long as the functions of the target of the present disclosure are not impaired.

As described above, the present disclosure is useful as an adsorption system.

The invention claimed is:

1. An adsorption system placed in an air passage for supplying air to a room, the adsorption system comprising:
   an adsorption section configured to adsorb a target substance except water; and
   a reduction section configured to reduce accumulation of moisture in the adsorption section,
   an adsorbent used in the adsorption section containing a metal-organic framework, and
   the reduction section including a heating element configured to
     heat the adsorption section and
     evaporate moisture in air that has flowed into the adsorption section.

2. The adsorption system of claim 1, wherein
the reduction section includes a dehydration element placed upstream of the adsorption section.

3. The adsorption system of claim 1, wherein
the reduction section includes a decrease element configured to decrease a flow rate of air flowing into the adsorption section.

4. The adsorption system of claim 2, wherein
the reduction section includes a decrease element configured to decrease a flow rate of air flowing into the adsorption section.

5. The adsorption system of claim 1, wherein
the reduction section is configured to perform a reduction operation that reduces the accumulation of the moisture in accordance with a humidity of air flowing into the adsorption section.

6. The adsorption system of claim 2, wherein
The reduction section is configured to perform a reduction operation that reduces the accumulation of the moisture in accordance with a humidity of air flowing into the adsorption section.

7. The adsorption system of claim 3, wherein
The reduction section is configured to perform a reduction operation that reduces the accumulation of the moisture in accordance with a humidity of air flowing into the adsorption section.

8. The adsorption system of claim 1, wherein
the metal-organic framework contains zinc.

9. The adsorption system of claim 2, wherein
the metal-organic framework contains zinc.

10. The adsorption system of claim 3, wherein
the metal-organic framework contains zinc.

11. The adsorption system of claim 5, wherein
the metal-organic framework contains zinc.

* * * * *